United States Patent [19]

Cook et al.

[11] Patent Number: 5,412,994
[45] Date of Patent: May 9, 1995

[54] OFFSET PRESSURE SENSOR

[76] Inventors: James D. Cook, 1558 W. Harrison Ave.; Albert W. Drabowicz, 2847 Rte. 20 West, both of Freeport, Ill. 61032; D. Joseph Maurer, 785 N. Silberman Rd., Pearl City, Ill. 61062; Mark R. Plagens, 1805 Normandy Dr., Richardson, Tex. 75082; Uppili Sridhar, 5238 Wood Creek La., Garland, Tex. 75044; Carl E. Stewart, 2401 Fountain Head Dr., Plano, Tex. 75023

[21] Appl. No.: 259,429

[22] Filed: Jun. 14, 1994

[51] Int. Cl.6 .............................................. G01L 7/00
[52] U.S. Cl. ........................................ 73/756; 73/708; 73/720; 73/721; 73/719; 73/725; 73/726; 73/727
[58] Field of Search ................ 73/719, 720, 721, 725, 73/726, 727, 756, 708

[56] References Cited

U.S. PATENT DOCUMENTS

| | | | |
|---|---|---|---|
| 4,683,757 | 8/1987 | Adams et al. | 73/756 |
| 4,995,953 | 2/1991 | Yee | 204/129.3 |
| 5,184,107 | 2/1993 | Maurer | 73/721 |
| 5,187,985 | 2/1993 | Nelson | 73/708 |
| 5,257,547 | 11/1993 | Boyer | 73/756 |

Primary Examiner—Richard E. Chilcot, Jr.
Assistant Examiner—Jewel V. Artis
Attorney, Agent, or Firm—William D. Lanyi

[57] ABSTRACT

A pressure sensor is provided in which the pressure sensing components are isolated from a portion of an attached buffer member which is connected to a fluid conduit. The offset characteristic of the pressure sensor isolates stress from being transmitted between an attached external fluid conduit and the sensitive components of the pressure sensor. One embodiment of the pressure sensor solders a fluid conduit structure to a buffer member that is attached to a pressure sensor die. An alternative embodiment of the present invention avoids the need for making solder connections between the sensor structure and external components by utilizing elastomeric conductors and pressure seals in association with the pressure sensor composite structure and first and second housing structures. These elastomeric conductors also provide improved stress isolation. The housing structures are used to compress to the seal and the elastomeric conductor against selected portions of the composite sensor.

18 Claims, 7 Drawing Sheets

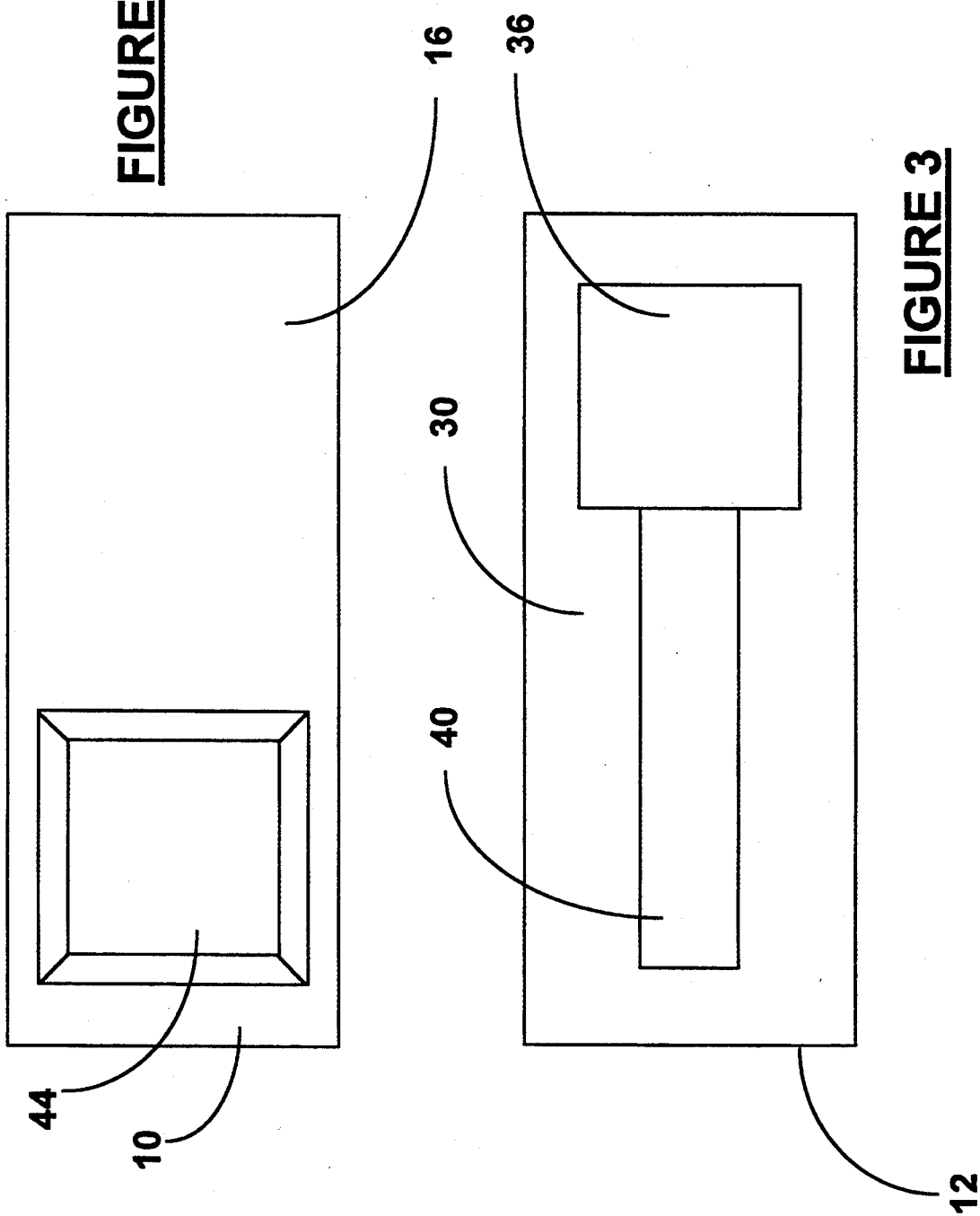

OFFSET PRESSURE SENSOR

BACKGROUND OF THE INVENTION

1. Field of the Invention

The present invention relates generally to pressure sensors and, more specifically, to a pressure sensor which comprises a sensor die and a buffer member which are attached together to form a combined structure, wherein a fluid port is provided through the buffer member at a location that is offset from the sensing portion of the sensor die.

2. Description of the Prior Art

Many different types of pressure sensors are known to those skilled in the art. One particular type of pressure sensing device comprises a silicon die that is etched to form a cavity in a surface of the die. The etched cavity does not extend entirely through the thickness of the die but, instead, a diaphragm portion is left remaining in the opposite surface of the silicon substrate. The diaphragm portion is sufficiently thin to flex in response to differences in pressure on its upper and lower surfaces. In a manner that is well known to those skilled in the art, stress sensitive components can be disposed on the upper surface of the diaphragm portion over the cavity that is formed in the opposite surface. When the diaphragm portion flexes in response to pressure exerted on it, the stress sensitive components provide a means for detecting the flexing of the diaphragm portion. It is common for piezoresistors to be used as the stress sensing components.

In order to achieve miniaturization, an electronic circuit can be disposed on a common surface of the pressure sensor die with the stress sensing components. In addition, electrically conductive pads can be deposited on the same surface of the pressure sensor die in order to facilitate the connection of the die to external devices. The pressure sensor die is commonly made of silicon. In addition, it can be attached to a silicon or glass substrate which provides stress isolation between the diaphragm portion of the die and external components, such as fluid conduits, which are typically used to conduct a flow of a fluid to the cavity portion of the die or to the portion above the diaphragm portion of the die. Silicon pressure transducers of this general type can be used to measure either absolute pressure or differential pressure.

In the manufacture of pressure sensor components, the structures used to package the silicon die and the fluid conduits can lead to the introduction of additional stresses. For example, if the thermal coefficient of expansion of the attached devices is different than the thermal coefficient of expansion of silicon, temperature changes can induce stresses in the structure. Many different types of packaging techniques have been developed to minimize the introduction of stress and the transfer of stress from external components to the diaphragm portion of the die and its attached stress responsive components.

U.S. Pat. No. 5,257,547, which issued to Boyer on Nov. 2, 1993, discloses an amplified pressure transducer which incorporates numerous stress reducing characteristics. The pressure sensor is mounted to a ceramic plate with a buffer plate therebetween in order to isolate the pressure sensor from stresses that could be transmitted through the ceramic plate. The ceramic plate is necessary for the purpose of supporting a plurality of electronic components which comprise an amplification and compensation circuit. The plate is separated from all parts of its housing except a minimal central surface on a support boss which provides the support for the pressure sensitive device.

U.S. Pat. No. 5,187,985, which issued to Nelson on Feb. 23, 1993, describes an amplified pressure transducer circuit which includes a bridge arrangement of piezoresistors that are connected to a diaphragm that is sensitive to a pressure being monitored. The output of the sensor bridge is provided to a preamplifier which is, in turn, associated with an attenuation network and compensation circuitry. The transducer incorporates a plurality of temperature sensitive resistors within the compensation circuit and these temperature sensitive resistors are produced at the same time and during the same manufacturing step as the piezoresistors of the bridge arrangement.

U.S. Pat. No. 5,184,107, which issued to Maurer on Feb. 2, 1993, discloses a piezoresistive pressure transducer with a conductive elastomeric seal. The transducer utilizes premolded elastomeric seals in which at least one seal is electrically conductive. A piezoresistive stress sensitive element in the form of a diaphragm of semiconductor material having a thickened rim is held at its rim between a pair of premolded elastomeric seals in a two piece housing. Electrical connections with external circuitry are made by conductive paths through one of the elastomeric seals which makes contact with electrical leads which pass through the housing wall.

U.S. Pat. application Ser. No. 08/028,499, which was filed by Maurer on Mar. 9, 1993 and assigned to the Assignee of the of the present application (M10-15191), describes a pressure sensor with improved heat dissipation characteristics which is provided with a means for efficiently removing heat from a circuit portion of a sensor die by providing an elastomeric member between a first surface of the sensor die and electrical leads. A thermally conductive, but electrically insulative, portion of the elastomeric member is disposed between the circuit portion of the sensor die and the leads and a means is provided for urging the first surface of the sensor die into thermal communicating contact with the thermally conductive portion of the elastomeric member. In addition, a selectively conductive portion of the elastomeric member is disposed between contact pads on the first surface of the sensor die and electrical leads encapsulated within a portion of the sensor housing. The elastomeric member is also provided with an opening formed therethrough and aligned with the diaphragm portion of the sensor die to permit the media to be in fluid communication with the diaphragm of the sensor die. The improved sensor die arrangement provided by the present invention can be adapted for use in either an absolute pressure sensing embodiment or a differential pressure sensing embodiment.

In view of the difficulties commonly encountered when silicon sensor dies are packaged in housing structures and attached to fluid conduits, it would be significantly beneficial if a means were provided to reduce the possibility of inducing stresses in the pressure sensor diaphragm portion and transferring stresses from the attached packaging and conduit components to the diaphragm portion.

SUMMARY OF THE INVENTION

In a preferred embodiment of the present invention, the pressure sensor comprises a pressure sensor die that has first and second surfaces. The sensor die has a diaphragm portion of its first surface which extends across an etched cavity formed in the second surface. A pressure sensing component is disposed on the first surface of the sensor die proximate the diaphragm portion and an electronic circuit is connected in signal communication with the pressure sensing die. The cavity is formed in a second surface of the pressure sensor die. A buffer member, having a first opening extending through the buffer member and the first channel formed in a first surface of the buffer member, is attached to the pressure sensor die. The first opening extends between the first and second surfaces of the buffer member and a first channel is formed in the first surface of the buffer member in fluid communication with the first opening. The first surface of the buffer member is attached to the second surface of the pressure sensor die to form a combined structure. The first channel is disposed in fluid communication with the cavity of the sensor die and the first opening is disposed in nonaligned association with the cavity. The diaphragm portion and the first opening are disposed at opposite ends of the structure. A first fluid conduit is disposed in fluid communication with the first opening of the buffer member.

In one embodiment of the present invention, a solder joint is disposed between the first fluid conduit and the second surface of the buffer member. In another embodiment of the present invention, the pressure sensor further comprises a first housing member and a second housing member. The second housing member has an electrically conductive lead extending therefrom. A seal is disposed between the first housing member and the second surface of the buffer member. An elastomeric conductor is disposed between the first surface of the pressure sensor die and the conductive lead. The elastomeric conductor is disposed in signal communication with the electronic circuit. The seal, the elastomeric conductor and the structure are disposed between the first and second housing members with the first fluid conduit being formed in the first housing member.

In one embodiment of the present invention, the second housing member comprises a second fluid conduit formed therein and disposed in fluid communication with the first surface of the pressure sensor die proximate the diaphragm portion of the die.

In a particularly preferred embodiment of the present invention, the buffer member is made of Hoya SD2 glass. In certain embodiments of the present invention, the second surface of the buffer member can further comprise a slit, or saw kerf to provide further stress isolation between the opening of the buffer member and the pressure sensing portion of the sensor die.

BRIEF DESCRIPTION OF THE DRAWINGS

The present invention will be more fully understood from a reading of the Description of the Preferred Embodiment in conjunction with the drawings, in which:

FIG. 2 shows the second surface of the sensor die;

FIG. 3 shows the first surface of the buffer member;

DESCRIPTION OF THE PREFERRED EMBODIMENT

Figure 1:
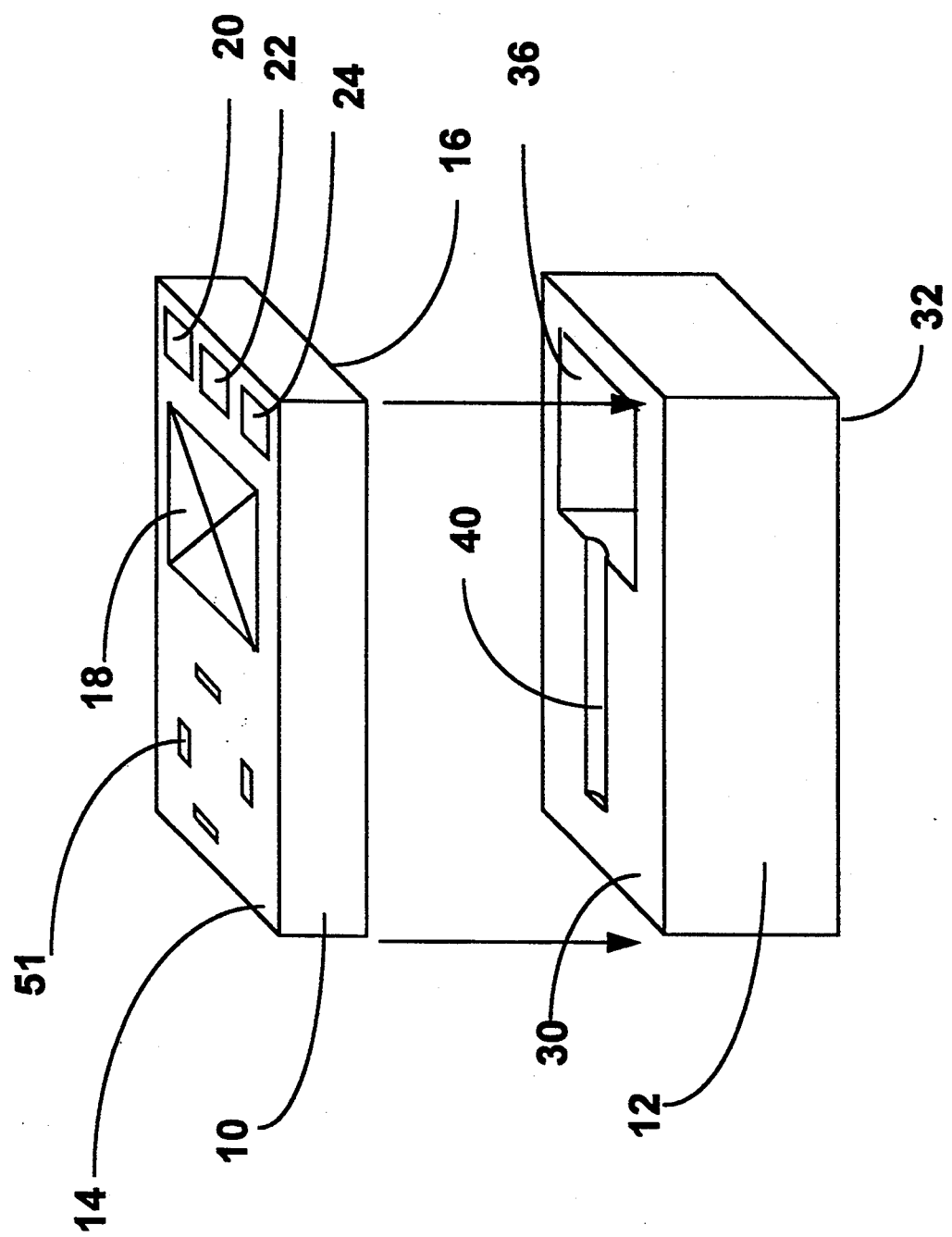
FIG. 1 shows an exploded perspective view of a sensor die and a buffer member.

Throughout the Description of the Preferred Embodiment, like components will be identified by like reference numerals.

FIG. 1 illustrates an exploded perspective view of the sensor die 10 associated with the buffer member 12. The sensor die 10 has a first surface 14 and a second surface 16. On the first surface 14 of the sensor die 10, an electronic circuit 18 is provided. The electronic circuit 18 is schematically represented in FIG. 1 for purposes of simplicity. In addition, three conductive pads, 20, 22 and 24, are provided and connected in signal communication with the electronic circuit 18.

As will be described in greater detail below, a diaphragm portion of the first surface 14 is provided with pressure sensing components, such as piezoresistors in a manner that is well known to those skilled in the art of pressure sensor design. A cavity is etched in the second surface 16 of the pressure sensor die 10. The cavity is not shown in FIG. 1, but will be described in greater detail below.

With continued reference to FIG. 1, the buffer member 12 has a first surface 30 and a second surface 32. An opening 36 is formed through the buffer member 12, extending from the first surface 30 to the second surface 32. In the first surface 30, a channel 40 is formed and disposed in fluid communication with the opening 36.

FIG. 2 shows the second surface 16 of the pressure sensor die 10. The cavity 44 is etched into the second surface 16. In a preferred embodiment of the present invention, the pressure sensor die 10 is made of silicon.

FIG. 3 illustrates the buffer member 12 with its first surface 30. In addition, the first opening 36 is shown connected in fluid communication with the first channel 40.

Figure 4:
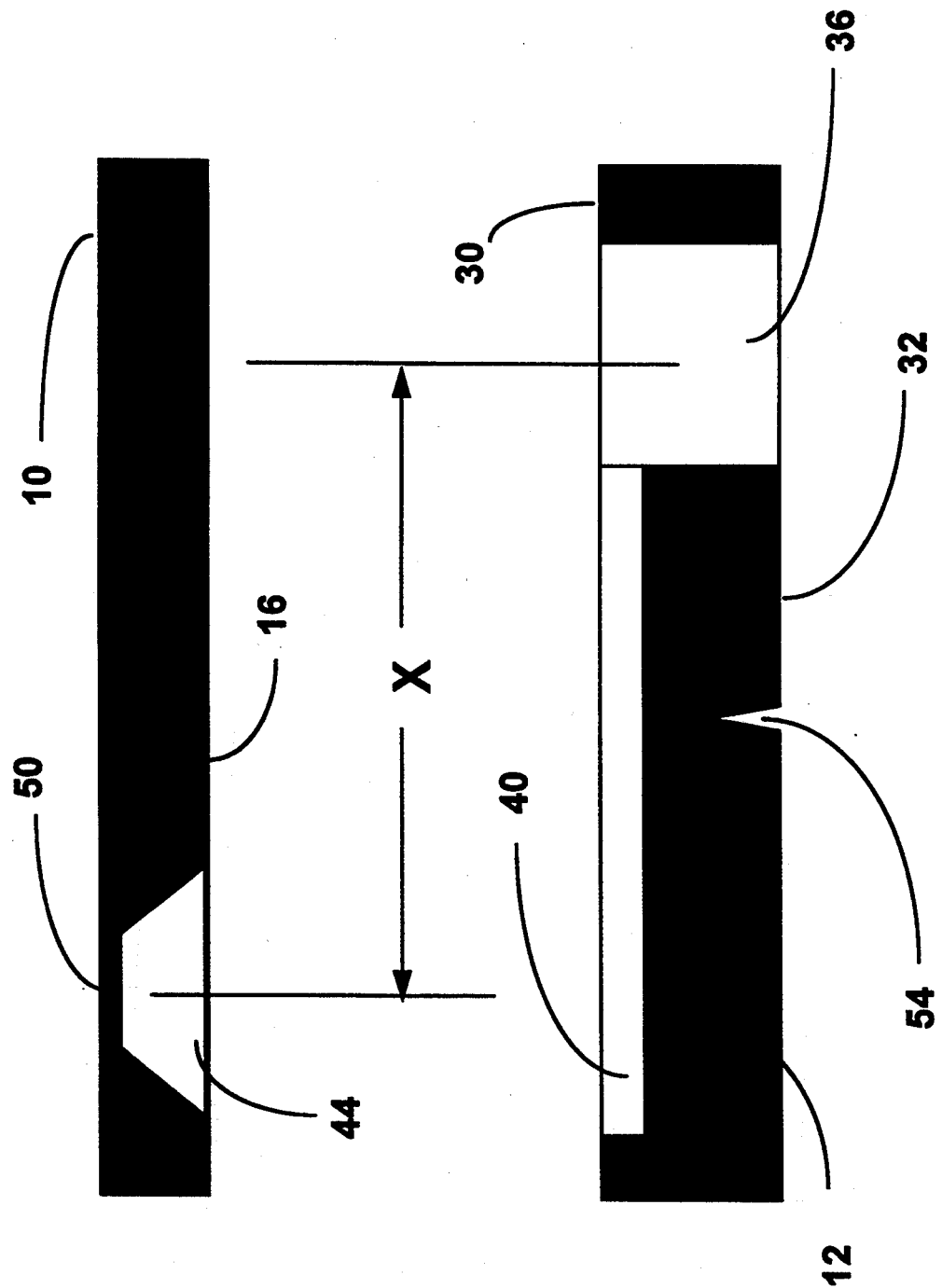
FIG. 4 is an exploded view of the composite sensor structure that comprises the silicon die and the buffer member of the present invention and illustrates the offset characteristic between a first opening of the buffer member and a diaphragm of the sensor die.

With reference to FIGS. 2, 3 and 4, the relative positions of the cavity 44 and its associated diaphragm 50 are shown in relation to the first opening 36 in the buffer member 12. Since the second surface 16 of the silicon is intended to be attached to the first surface 30 of the buffer member, it can also be seen that the channel 40 will provide fluid communication between the first opening 36 in the buffer member and the cavity 44 in the second surface 16 of the pressure sensor die 10.

FIG. 4 shows the pressure sensor die 10 and the buffer member 12 next to each other for comparison of the relative positions of there respective component parts. The cavity 44 is formed in the second surface 16 of the pressure sensor die 10 and is generally aligned with a diaphragm portion 50 in the first surface of the pressure sensor die 10. In the section view of the buffer member 12, the first opening 36 is shown extending through the thickness of the buffer member between its first surface 30 and its second surface 32. As can be seen in Figure 4, when the second surface 16 of the pressure sensor die 10 is disposed in contact with the first surface 30 of the buffer member 12, the etched cavity 44 will be disposed in fluid communication with the channel 40. In addition, since the channel 40 is in fluid communication with the first opening 36, the first opening 36 will be disposed in fluid communication with the cavity 44.

FIG. 4 illustrates the offset characteristic of the present invention. Dimension X illustrates that the first opening 36 is disposed at one end of the combined structure and that the cavity 44 and diaphragm 50 are disposed at an opposite end of the combined structure this offset is illustrated by dimension X. The offset nature of the combined structure necessitates the use of fluid channel 40 to provide fluid communication between the cavity 44 and the first opening 36.

With continued reference to FIG. 4, certain preferred embodiments of the present invention also provide a saw kerf 54, or slit, between the positions of the first opening 36 and the cavity 44 in order to assure improved stress isolation between their respective locations. The preferred embodiments of the present invention, which will be described in greater detail below, utilize the offset characteristic between the cavity 44 and the first opening 36, regardless of whether fluid conduits are rigidly attached by solder to the buffer member 12 or, alternatively, connected by pressure seals provided by housing members.

Figure 5:
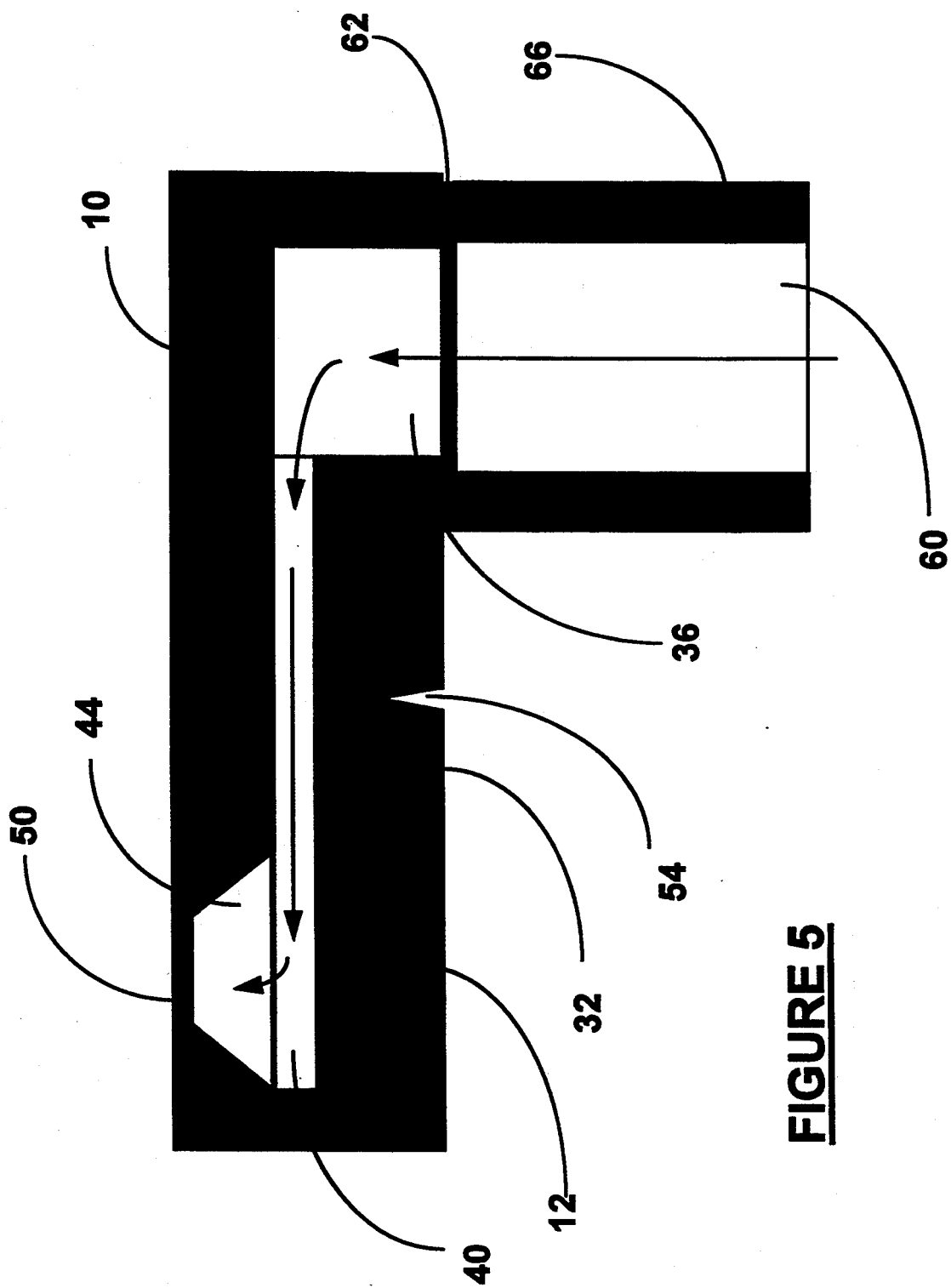
FIG. 5 shows an assembled view of one embodiment of the present invention wherein a fluid conduit structure is soldered to the buffer member.

FIG. 5 illustrates the combined structure formed by attaching the pressure sensor die 10 to the buffer member 12. One embodiment of the present invention, as illustrated in FIG. 5, attaches a fluid conduit 60 to the buffer member 12 as shown. In this embodiment of the present invention, a solder layer 62 can be used to attach the body 66 of the fluid conduit 60 to the second surface 32 of the buffer member 12. The arrows in Figure 5 indicate the fluid communication between the fluid conduit 60, the first opening 36, the first channel 40 and the cavity 44 which permits pressure sensing components 51 on the first surface of the pressure sensing die 10, which are disposed in force transmitting relation with the diaphragm 50, to sense the pressure in the fluid conduit 60.

Figure 6:
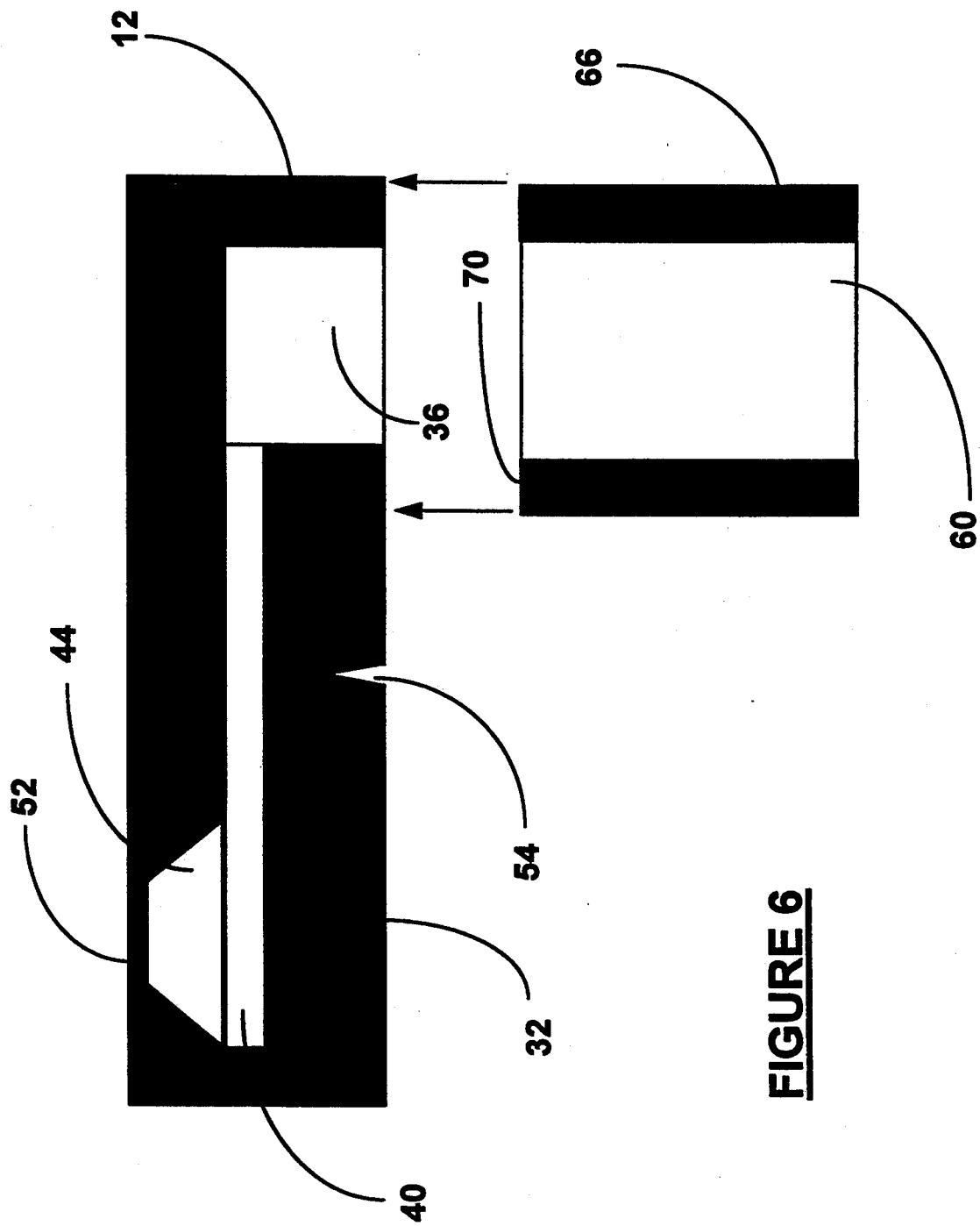
FIG. 6 is an exploded view of FIG. 5.

FIG. 6 illustrates an exploded view of one embodiment of the present invention, wherein the body 66 of the fluid conduit 60 is separated from the second surface 32 of the buffer member 12. As described above, the pressure sensor 10 and the buffer member 12 are attached together to form a combined sensing structure that can be connected to the fluid conduit 60. When the fluid conduit 60 is attached to the buffer member 12, as described above, a pressure sensor is provided which is mechanically isolated from stresses in the associated package material. These stresses can be caused by environmental conditions including thermal cycling. In addition, the stresses can be caused by the media being measured within the cavity 44, the channel 40, the first opening 36 and the fluid conduit 60. In a particularly preferred embodiment of the present invention, the buffer member 32 is made of Hoya SD2 glass because it has a thermal coefficient of expansion that is very similar to that of silicon of which the pressure sensor die 10 is made. The Hoya SD2 glass is attached to the pressure sensor die 10 by thermal electric bonding. In addition, the second surface 32 of the buffer member 12 is metallized in order to enhance the solderability of the second surface 32 to the surface 70 of the fluid conduit body 66. The solder material 62, which is shown in FIG. 5, is a tin-silver eutectic solder. This particular material is selected for use as the solder in a preferred embodiment of the present invention because of its media compatibility and its low creep characteristics. In addition, this particular type of solder does not require excessively high temperatures during the bonding process and therefore results in lower sensor hysteresis that could be caused by solder strain in the package. Also, the low temperature process allows the die to be calibrated prior to final assembly. Tin-silver solder is an alloy that has advantageous fatigue properties when subjected to thermal shock and exhibits good solderability to an Invar material which is used as the fluid conduit body 66 in a preferred embodiment of the present invention.

With continued reference to FIG. 6, Invar is used as the fluid conduit body 66. This alloy, which comprises 36 percent nickel and 64 percent iron, has a low thermal coefficient of expansion which is similar to that of silicon. This improves the silicon sensor performance over temperature by reducing temperature induced mechanical strain that could otherwise be transmitted to the sensor die.

The structure shown in FIG. 5 is particularly suitable for pressure sensors that are used in applications that require direct contact with harsh media such as gasoline, methanol, freon and ammonia. This type of application is particularly advantageous if the pressure sensor is intended for use in automotive applications. In addition, the pressure sensor shown in FIG. 5 is advantageous in applications which require inorganic packages. For example, pressure sensing applications in gas chromatography require inorganic package materials. The sensor shown in FIG. 5 also exhibits high strength and ruggedness.

Figure 7:
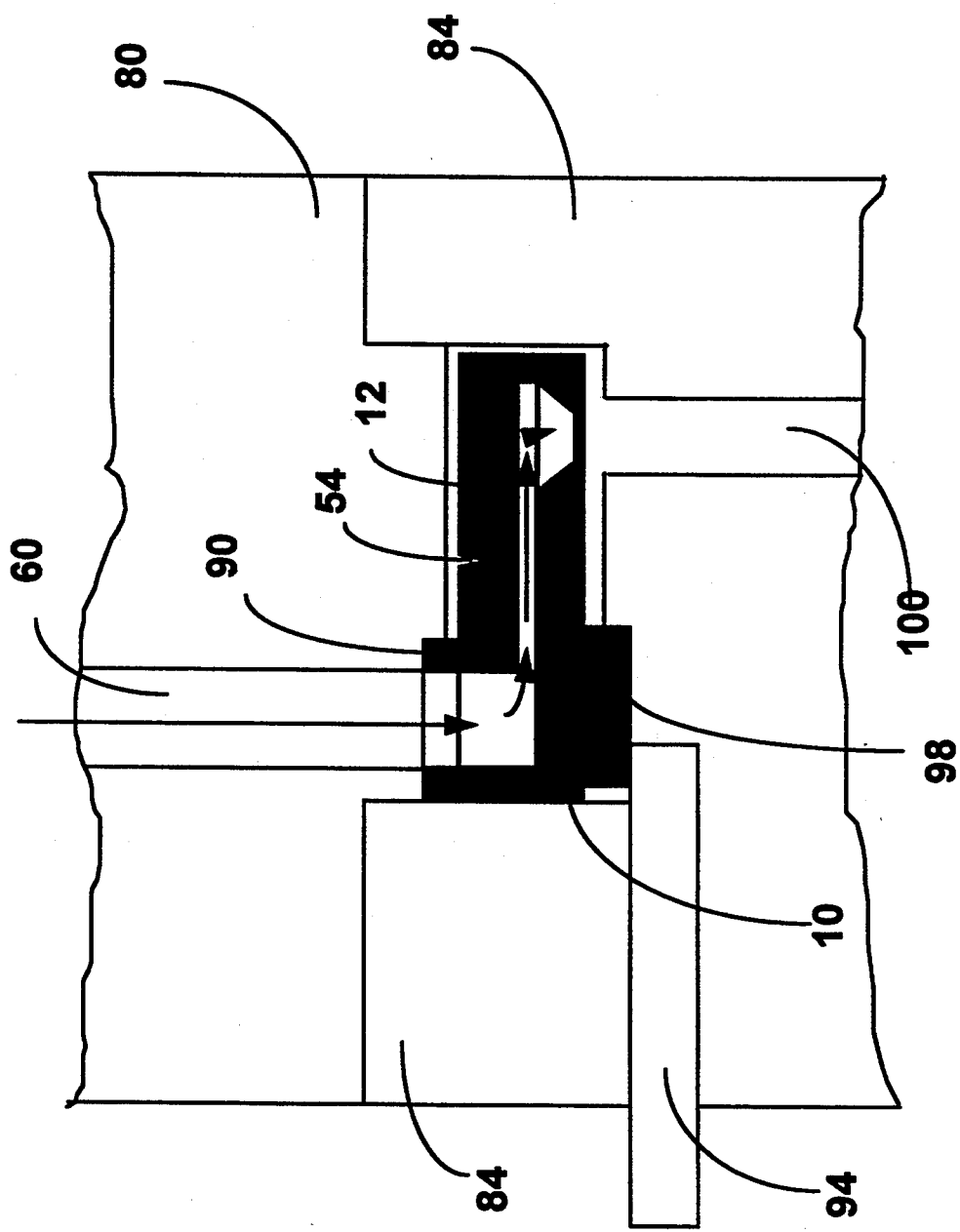
FIG. 7 shows an assembled view of an alternative embodiment of the present invention that utilizes first and second housing structures.

FIG. 7 shows another embodiment of the present invention which does not require that components be soldered to the combined sensor structure of the present invention. It should be understood that the combined structure shown in FIG. 7 shows the buffer member 12 being disposed above the sensor die 10, in contradistinction to the previous illustrations. A first housing member 80 has the fluid conduit 60 extending therethrough. A second housing member 84 is also provided and shaped to fit with the first housing member 80 as shown. The fluid conduit 60, which extends through the first housing member 80, is disposed in fluid communication with the first opening of the buffer member 12. Between the buffer member 12 and the portion of the first housing member 80 around the fluid conduit 60, a seal 90 is provided to assure that the fluid being measured does not leak from its path through the fluid conduit 60 to the cavity of the silicon pressure die 10. Seal 90 also provides a certain amount of stress isolation. As described above in conjunction with FIG. 1, the first surface of the silicon pressure die 10 is provided with contact pads, 20, 22 and 24, that are connected in fluid communication with the pressure sensing components on the diaphragm. In order to provide electrical communication between those pads and external devices, a plurality of electrically conductive leads 94 extend through the second housing member 84. To provide electrical communication between the pads, 20, 22 and 24, and the electrically conductive leads, an elastomeric conductor 98 is disposed in contact with the first surface of the sensor die 10 as shown. Although the view of FIG. 7 only shows a single lead 94, it should be understood that a typical application of the present invention would incorporate three conductive leads that are each connected in electrical communication with a preselected one of the contact pads on the first surface of the sensor die. By pressing the first housing member 80 into the second housing member 84, a compressive force is provided which serves several purposes. First, it maintains a leak tight arrangement in cooperation with seal 90. Secondly, it provides signal communication between the conductive pads and the elastomeric conductor 98 and, in addition, provides electrical communication between the elastomeric conductor 98 and the electrical leads. In addition, elastomeric conductor 98 provides stress relief of the die from the package.

With continued reference to FIG. 7, the cross hatch arrangement shown in the elastomeric conductor 98 represents the fact that a portion of the conductor is electrically conductive in a direction through the thickness of the elastomeric conductor 98 while the portion on the right of the elastomeric conductor is not conductive.

In some embodiments of the present invention, a second fluid conduit 100 is provided through the second housing member 84 in order to permit the pressure sensor to be used to measure differential pressures. When this is done, an O-ring seal is provided between the components identified by reference numerals 80 and 84 in FIG. 7. In the type of application shown in FIG. 7, signals from the pressure sensor die would provide information relating to the differential pressure between the fluid in fluid conduit 60 and the fluid in fluid conduit 100.

Figure 8:
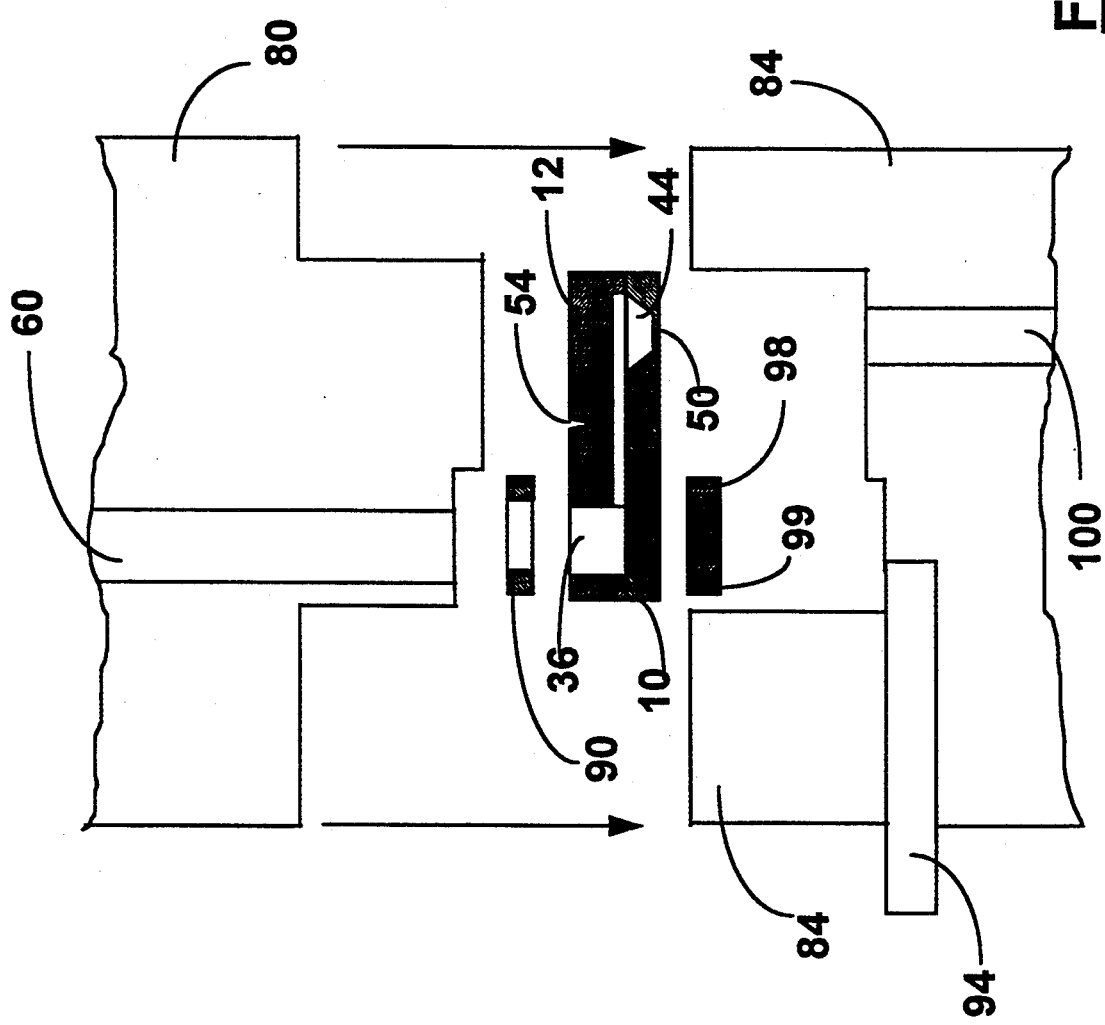
FIG. 8 is an exploded view of FIG. 7.

FIG. 8 illustrates an exploded view of the sensor shown in FIG. 7. As can be seen in FIG. 8, the combined structure which incorporates the pressure sensor die 10 and the buffer member 12 is associated with the seal 90 and the elastomeric conductor 98 to provide a sealed sensor in combination with the first housing member 80 and the second housing member 84. In FIG. 8, a portion of the elastomeric conductor 98 is identified by reference numeral 99. This is intended to show that the left portion of the elastomeric conductor, identified by reference numeral 99, is selectively conductive in the vertical direction while the remaining portion toward the right in FIG. 8 is nonconductive. This provides electrical communication between the lead 94 and the conductive pads on the first surface of the sensor die 10. The exploded view in FIG. 8 also illustrates the general alignment between the fluid conduit 60, the seal 90 and the first opening 36. It also shows a general alignment between the second fluid conduit 100 and the diaphragm 50 which is disposed over the cavity 44 in the sensor die 10. Although not particularly identified by dimension X, as discussed above, it can also be seen that the fluid conduit 60 is offset from the location of the diaphragm 50 and its associated pressure sensing components. This offset, in combination with the elastomeric elements, provides a stress isolation between the sensing components on the diaphragm 50 and the contact between the composite structure and the first housing member 80 in the region of the fluid conduit 60.

Whether applied in the embodiment shown in FIGS. 7 and 8, where the composite structure of the sensor die and the buffer member are compressed between housing structures in order to avoid the need for soldering or, alternatively, in the embodiment shown in FIG. 5 where a fluid conduit is soldered to the second surface of the buffer member, the present invention provides an offset dimension between the first opening of the buffer and the diaphragm of the sensor die. This offset characteristic improves the stress isolation between the attachment of the composite structure to a fluid conduit and the location on the sensor die where the sensitive components are located. It also improves stress isolation to seal 98 which is another source of undesirable temperature dependent stresses. This improved stress isolation provides increased accuracy and reduced packaging errors that otherwise are present in known sensor manufacturing.

Although the present invention has been described with particular detail and illustrated with significant specificity, it should be understood that other embodiments of the present invention are within its scope. The particular attachment techniques described above are not limiting and the materials discussed in conjunction with both preferred embodiments of the present invention can be replaced by alternative materials.

The embodiments of the invention in which an exclusive property or right is claimed are defined as follows:

1. A pressure sensor, comprising:
   a pressure sensor die with first and second surfaces, said sensor die having a diaphragm portion of said first surface extending across an etched cavity formed in said pressure sensor die;
   a pressure sensing component disposed on said first surface of said sensor die proximate said diaphragm portion and an electronic circuit connected in signal communication with said pressure sensing component, said cavity being formed in a second surface of said pressure sensor die;
   a buffer member having a first opening extending through said buffer member and a first channel formed in a first surface of said buffer member, said first opening extending between said first surface of said buffer member and a second surface of said buffer member, said first channel being in fluid communication with said first opening, said first surface of said buffer member being attached to said second surface of said pressure sensor die to form a combined structure, said first channel being disposed in fluid communication with said cavity, said first opening being disposed in nonaligned association with said cavity, said diaphragm portion and said first opening being disposed at opposite ends of said structure; and
   a first fluid conduit being disposed in fluid communication with said first opening.

2. The pressure sensor of claim 1, further comprising:
   a solder joint disposed between said first fluid conduit and said second surface of said buffer member.

3. The pressure sensor of claim 1, further comprising:
   a first housing member;
   a second housing member, having an electrically conductive lead extending therefrom;
   a seal disposed between said first housing member and said second surface of said buffer member; and
   an elastomeric conductor disposed between said first surface of said pressure sensor die and said lead, said elastomeric conductor being disposed in signal communication with said electronic circuit, said seal, said elastomeric conductor and said structure being disposed between said first and second housing members, said first fluid conduit being formed in said first housing member.

4. The pressure sensor of claim 3, wherein:
   said second housing member comprises a second fluid conduit formed therein, said second fluid conduit being disposed in fluid communication with said first surface of said pressure sensor die proximate said diaphragm portion.

5. The pressure sensor of claim 1, wherein:
said second surface of said buffer member comprises a slit formed therein between the location of said first opening and the location of said cavity.

6. The pressure sensor of claim 1, wherein:
said second surface of said pressure sensor die and said first surface of said buffer member are bonded together by thermal electric bonding.

7. A pressure sensor, comprising:
a pressure sensor die with first and second surfaces, said sensor die having a diaphragm portion of said first surface extending across an etched cavity formed in said pressure sensing die;
a pressure sensing component disposed on said first surface of said sensor die proximate said diaphragm portion and an electronic circuit connected in signal communication with said pressure sensing component, said cavity being formed in a second surface of said pressure sensor die;
a glass buffer member having a first opening extending through said buffer member and a first channel formed in a first surface of said buffer member, said first opening extending between said first surface of said buffer member and a second surface of said buffer member, said first channel being in fluid communication with said first opening, said first surface of said buffer member being attached to said second surface of said pressure sensor die to form a combined structure, said first channel being disposed in fluid communication with said cavity, said first opening being disposed in nonaligned association with said cavity, said diaphragm portion and said first opening being disposed at opposite ends of said structure; and
a first fluid conduit being disposed in fluid communication with said first opening.

8. The pressure sensor of claim 7 further comprising:
a solder joint disposed between said first fluid conduit and said second surface of said buffer member.

9. The pressure sensor of claim 7, further comprising:
a first housing member;
a second housing member, having an electrically conductive lead extending therefrom;
a seal disposed between said first housing member and said second surface of said buffer member; and
an elastomeric conductor disposed between said first surface of said pressure sensor die and said lead, said elastomeric conductor being disposed in signal communication with said electronic circuit, said seal, said elastomeric conductor and said structure being disposed between said first and second housing members, said first fluid conduit being formed in said first housing member.

10. The pressure sensor of claim 9, wherein:
said second housing member comprises a second fluid conduit formed therein, said second fluid conduit being disposed in fluid communication with said first surface of said pressure sensor die proximate said diaphragm portion.

11. The pressure sensor of claim 7, wherein:
said buffer member is made of Hoya SD2 glass.

12. The pressure sensor of claim 7, wherein:
said second surface of said buffer member comprises a slit formed therein between the location of said first opening and the location of said cavity.

13. The pressure sensor of claim 7, wherein:
said second surface of said pressure sensor die and said first surface of said buffer member are bonded together by thermal electric bonding.

14. A pressure sensor, comprising:
a pressure sensor die with first and second surfaces, said sensor die having a diaphragm portion of said first surface extending across an etched cavity formed in said pressure sensing die;
a pressure sensing component disposed on said first surface of said sensor die proximate said diaphragm portion and an electronic circuit connected in signal communication with said pressure sensing component, said cavity being formed in a second surface of said pressure sensor die;
a buffer member having a first opening extending through said buffer member and a first channel formed in a first surface of said buffer member, said first opening extending between said first surface of said buffer member and a second surface of said buffer member, said first channel being in fluid communication with said first opening, said first surface of said buffer member being attached to said second surface of said pressure sensor die to form a combined structure, said first channel being disposed in fluid communication with said cavity, said first opening being disposed in nonaligned association with said cavity, said diaphragm portion and said first opening being disposed at opposite ends of said structure, said second surface of said pressure sensor die and said first surface of said buffer member being bonded together by thermal electric bonding; and
a first fluid conduit being disposed in fluid communication with said first opening.

15. The pressure sensor of claim 14, further comprising:
a solder joint disposed between said first fluid conduit and said second surface of said buffer member.

16. The pressure sensor of claim 14, further comprising:
a first housing member;
a second housing member, having an electrically conductive lead extending therefrom;
a seal disposed between said first housing member and said second surface of said buffer member; and
an elastomeric conductor disposed between said first surface of said pressure sensor die and said lead, said elastomeric conductor being disposed in signal communication with said electronic circuit, said seal, said elastomeric conductor and said structure being disposed between said first and second housing members, said first fluid conduit being formed in said first housing member.

17. The pressure sensor of claim 16, wherein:
said second housing member comprises a second fluid conduit formed therein, said second fluid conduit being disposed in fluid communication with said first surface of said pressure sensor die proximate said diaphragm portion.

18. The pressure sensor of claim 14, wherein:
said second surface of said buffer member comprises a slit formed therein between the location of said first opening and the location of said cavity.

* * * * *